(12) United States Patent
McMurtry

(10) Patent No.: US 8,672,575 B2
(45) Date of Patent: Mar. 18, 2014

(54) PIVOT JOINT

(75) Inventor: David Roberts McMurtry, Dursley (GB)

(73) Assignee: Renishaw PLC, Wotton-under-Edge (GB)

( * ) Notice: Subject to any disclaimer, the term of this patent is extended or adjusted under 35 U.S.C. 154(b) by 276 days.

(21) Appl. No.: 12/308,188

(22) PCT Filed: Jun. 11, 2007

(86) PCT No.: PCT/GB2007/002179
§ 371 (c)(1),
(2), (4) Date: Dec. 9, 2008

(87) PCT Pub. No.: WO2007/144602
PCT Pub. Date: Dec. 21, 2007

(65) Prior Publication Data
US 2009/0297257 A1  Dec. 3, 2009

(30) Foreign Application Priority Data
Jun. 16, 2006 (GB) .................................. 0611984.6

(51) Int. Cl.
*F16C 11/06* (2006.01)
(52) U.S. Cl.
USPC ......................................................... 403/122
(58) Field of Classification Search
USPC .................. 403/84, 122, 128, 129, 169, 176,
403/DIG. 1, 166, 138, 144, 145; 269/8, 71,
269/74, 82, 254 CS; 33/503, 520, 556, 559,
33/644, 645
See application file for complete search history.

(56) References Cited

U.S. PATENT DOCUMENTS

| 4,322,098 | A | * | 3/1982 | Warshawsky ................. 403/138 |
| 4,776,749 | A |   | 10/1988 | Wanzenberg et al. |
| 5,568,993 | A | * | 10/1996 | Potzick ......................... 403/128 |
| 5,870,834 | A | * | 2/1999 | Sheldon ......................... 33/556 |
| 6,178,654 | B1 | * | 1/2001 | Kanatake ....................... 33/645 |
| 6,350,076 | B1 | * | 2/2002 | Wagner et al. ............ 403/122 X |
| 6,662,461 | B2 | * | 12/2003 | McMurtry ................... 33/558.2 |
| 6,869,246 | B2 | * | 3/2005 | Bridgers ...................... 403/229 |
| 7,040,033 | B2 | * | 5/2006 | Zhu et al. |
| 7,281,693 | B2 | * | 10/2007 | Chou ........................ 248/181.1 |
| 7,568,854 | B2 | * | 8/2009 | McMurtry .................... 403/128 |
| 7,841,097 | B2 | * | 11/2010 | Evans et al. .................... 33/502 |
| 7,861,364 | B2 | * | 1/2011 | Powell, Jr. ............. 403/122 X |
| 2003/0024297 | A1 |   | 2/2003 | McMurtry |
| 2003/0070311 | A1 |   | 4/2003 | Zhu et al. |
| 2003/0204959 | A1 |   | 11/2003 | Hall |
| 2004/0197132 | A1 | * | 10/2004 | McMurtry .................... 403/122 |

FOREIGN PATENT DOCUMENTS

| DE | 35 04 464 | C1 |   | 4/1986 |   |
| DE | 102007051714 |   | * | 5/2009 | ........... H01L 31/042 |
| EP | 1 400 783 | A2 |   | 3/2004 |   |
| EP | 1400783 | A2 | * | 3/2004 | ........... G01B 21/04 |

(Continued)

*Primary Examiner* — Gregory Binda
*Assistant Examiner* — Josh Skroupa
(74) *Attorney, Agent, or Firm* — Oliff PLC

(57) ABSTRACT

A pivot joint has a first member having a ball located at one end, a fixed member having one or more bearing surface, which locates on the ball of the first member and a second member having one or more bearing surface located at one end which locates onto the ball of the first member. The first and second members are rotatable about the center of the ball. This type of pivot joint is suitable for use in a machine such as a Stewart platform.

29 Claims, 4 Drawing Sheets

(56) References Cited

FOREIGN PATENT DOCUMENTS

| GB | 2 388 064 A | 11/2003 |
| JP | A-2002-295623 | 10/2002 |
| JP | A-2004-512618 | 4/2004 |
| JP | A-2005-37373 | 2/2005 |
| WO | WO 9514905 A1 * | 6/1995 ............ G01B 11/00 |
| WO | WO 2004/063579 A1 | 7/2004 |

* cited by examiner

PIVOT JOINT

The present invention relates to a pivot joint, in particular a high precision pivot joint. More particularly, the present invention relates to a pivot joint which enables two members to have rotational movement about the same point.

U.S. Pat. No. 6,662,461 discloses a machine which includes spherical supports located on a structure, onto which members are mounted such that they have rotational motion. Each spherical support comprises a sphere which is mounted in a magnetic socket within the structure. Each sphere supports two members. Each member is provided with a magnetic socket which holds the member in a universally pivotable manner to its respective ball.

International application WO 2004/063579 discloses a pivot joint in which a ball is retained in a receptacle of a first structure. Two struts are in contact with the ball via bearing surfaces. The struts are each provided with a hole at one end which partly receive and fit over the ball. The two struts are biased together to ensure contact between the ball and the struts at their bearing surfaces.

A first aspect of the present invention provides a pivot joint comprising:
  a first member having an at least part spherical region located at one end;
  a fixed member having one or more bearing surfaces, which locates on the at least part spherical region of the first member;
  a second member having one or more bearing surfaces located at one end which locates onto the at least part spherical region of the first member;
  such that the first and second members are rotatable about the centre of the at least part spherical region.

The at least part spherical region may comprise a ball.

A biasing device is preferably provided to bias one or both of the bearing surfaces against the at least part spherical region. The biasing device could for example comprise a magnet, gravity or spring.

One or both of the fixed member and second member may form an assembly in which the at least part spherical region is received.

The first and second bearing surfaces may have three points of contact with the ball. The first and/or second bearing surfaces may have line contact with the ball (i.e. in a circle).

Figure 1:
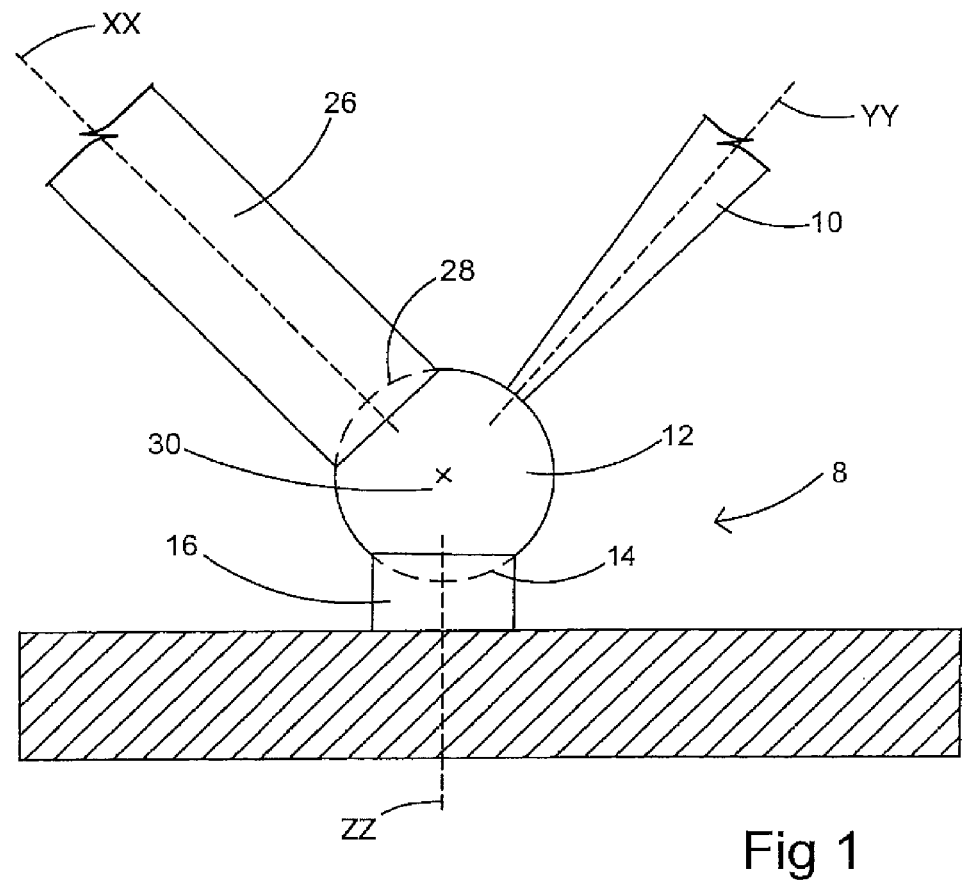
Figure 2:
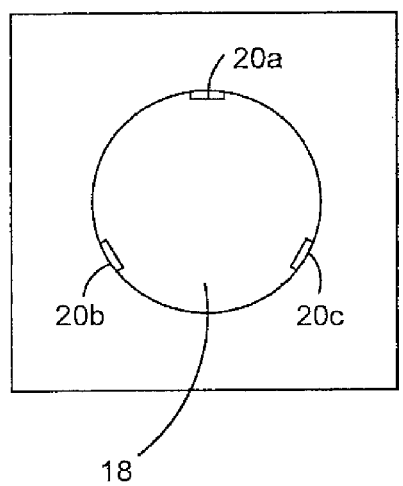
Figure 3:
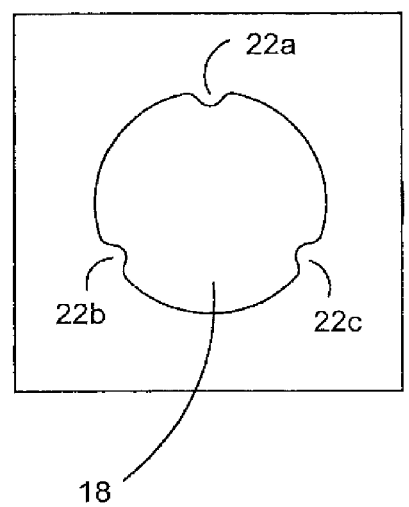
Figure 4:
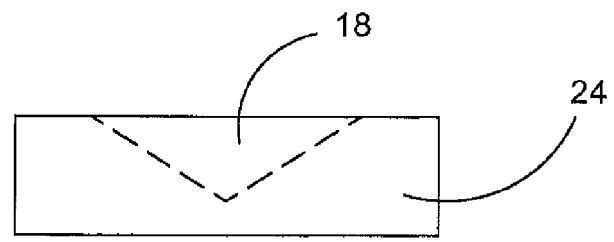
Figure 5:
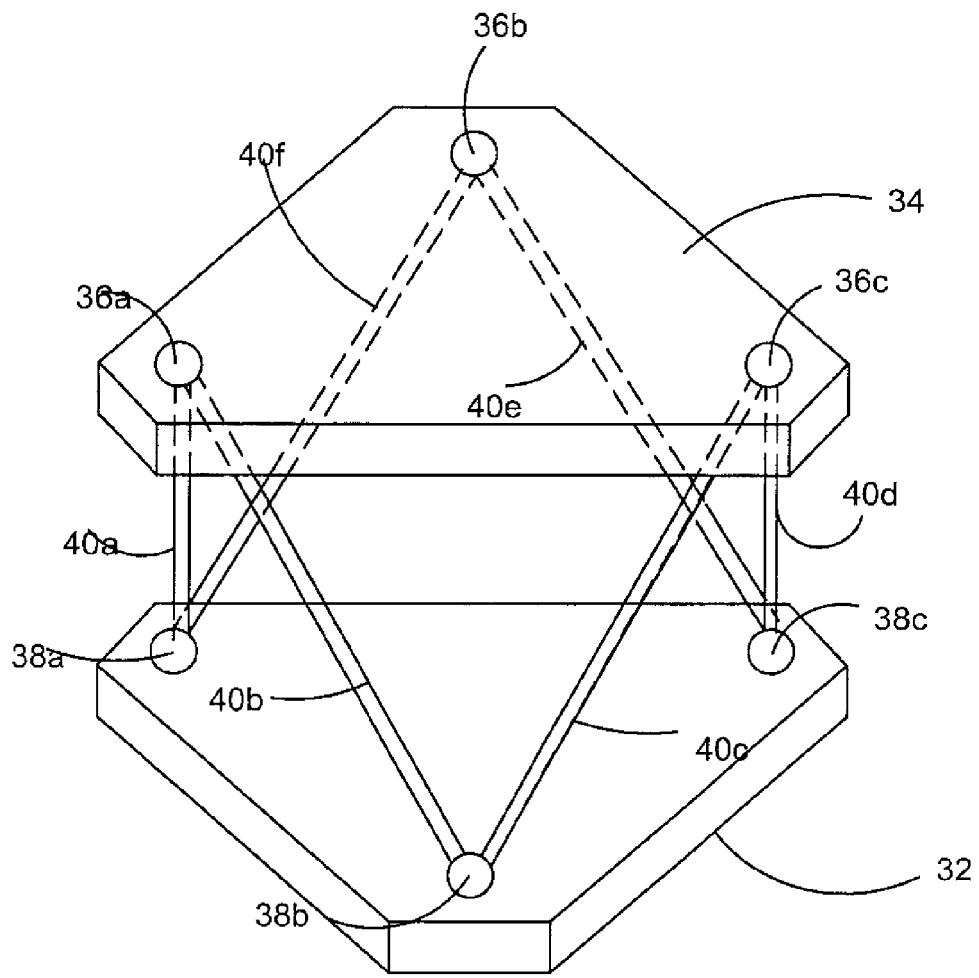
Figure 6:
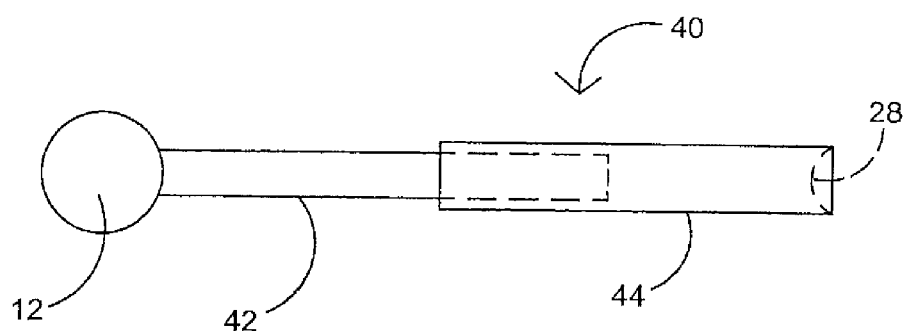
Figure 7:
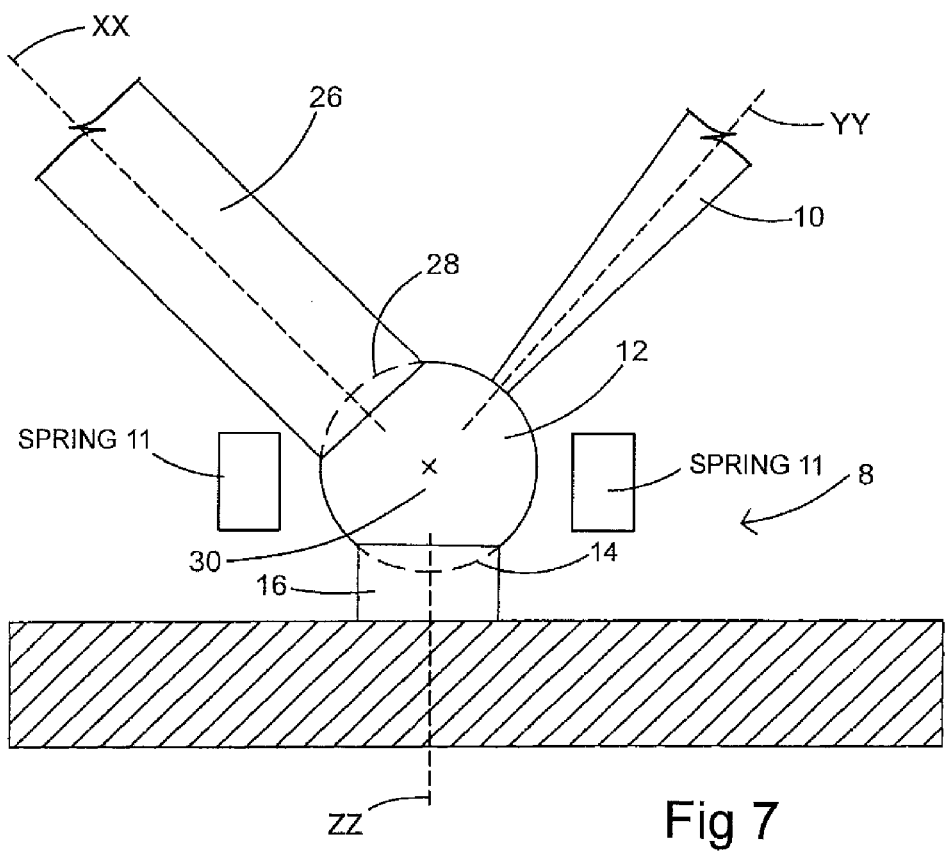
Figure 8:
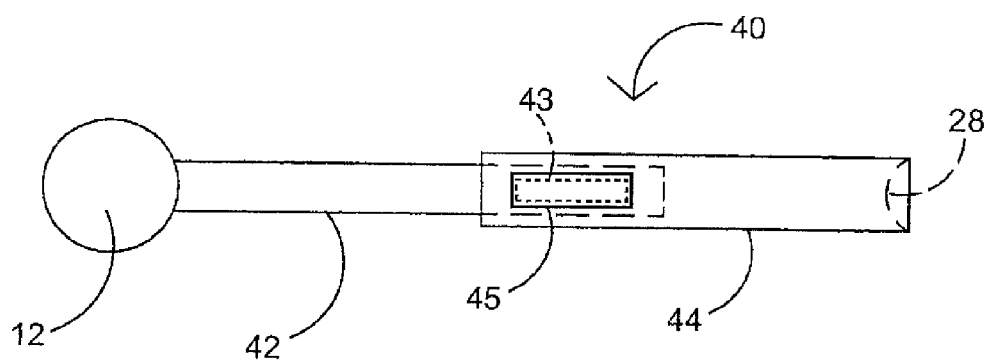

A second aspect of the present invention comprises a machine comprising:
  Upper and lower structures connected to one another via a plurality of struts;
  wherein the struts are connected to at least one of the upper and lower structures by pivot joints according to the first aspect of the invention.
Preferably the length of the strut between the upper and lower structures is adjustable Embodiments of the invention will now be described in more detail, with reference to the accompanying drawings in which:
  FIG. 1 illustrates a side view of the pivot joint of the present invention;
  FIG. 2 is a plan view of a first embodiment of a socket;
  FIG. 3 is a plan view of a second embodiment of a socket;
  FIG. 4 is a side view of a third embodiment of a socket;
  FIG. 5 is a perspective view illustrating a machine using the pivot joint illustrated in FIG. 1;
  FIG. 6 is a strut for use in the machine of FIG. 5;
  FIG. 7 illustrates an alternative side view of the pivot joint of the present invention; and
  FIG. 8 is an alternative strut for use in the machine of FIG. 5.

The pivot joint of the present invention is shown in FIG. 1. A first member 10 is provided with a ball 12 at one end. This ball 12 is as accurately spherical as possible. The ball may be attached to the member by known means, for example, welded, screwed or glued into place or the strut and ball may be formed as one piece. Although the term 'ball' is used, the ball may not be completely spherical. It is sufficient to have one or more part spherical regions at the end of the strut.

The ball 12 sits in a socket 14 which is provided in a fixed structure 16. The socket 14 has a substantially circular opening (18 in FIGS. 2 and 3) to receive the ball 12. FIGS. 2 and 3 illustrate plan views of two embodiments of the socket. In FIG. 2, three pads 20a,b,c are provided around the inner circumference of the opening 18 to provide three point contact between the socket and the ball. The pads may be replaced by other features and are preferably at an inclined surface. In FIG. 3, the opening 18 is formed with three protrusions 22a,b,c which contact the ball, forming three points of contact. These may be integral with the socket or formed by features such as ball bearings. In both these embodiments, the trihedral contact enables the ball to be accurately located within the socket. This arrangement of the ball and socket allows the ball to rotate within the socket whilst preventing translational motion, thereby allowing rotation of the member onto which it is attached.

FIG. 4 which shows a side view of another embodiment of the socket in cross section. In this embodiment the socket has a conical cross section 24, with the ball being supported by the circular contact between the ball and cone.

In each of these socket embodiments, a magnet is provided within the socket to attract the ball, which is preferably made of steel. This holds the ball within the socket whilst allowing it to rotate. The centre of the ball within the socket thus remains fixed. Another biasing device 11 may be used in place of a magnet, for example gravity or a spring. If a spring is used, it may be mounted between the first member 10 and the fixed structure 16 to trap the ball 12 in place.

This arrangement so far described enables a single member to be rotated relative to a fixed structure. However, it may be desirable to mount two members on a single joint.

A second member 26 is shown in FIG. 1 mounted to the pivot joint 8. The member 26 is provided with a socket 28 at one end. This socket 28 has a similar form as described with reference to FIGS. 2-4.

The socket 28 sits on the ball 12 provided by the first member. The socket ended member 26 can thus rotate about the centre 30 of the ball 12 and thus about the same centre 30 as the ball ended member 10 rotates. It is apparent from FIG. 1 that a longitudinal axis XX of the second member 26, a longitudinal axis YY of the first member 10, and a longitudinal axis ZZ of the fixed member 16 each pass through the centre 30 of the ball 12. It is also apparent from FIG. 1 that the bearing surfaces of the second member 26 face substantially in the same direction as the longitudinal axis XX of the second member 26. With the particular arrangement depicted in FIG. 1, the first and second members 10, 26 have been pivoted about the ball 12 so that the first, second and fixed members 10, 26, 16 are spaced substantially equally around the centre of the ball 12.

As before, the second member may be biased into position for example by magnets, gravity or springs. If a spring is used as biasing device 11, it may be mounted between the second member 26 and the fixed member 16 to thereby trap the ball 12 in place (See, e.g., FIG. 7).

In an alternative arrangement, the ball may be trapped in the fixed structure or a combination of the fixed structure and socket 28, by forming one or both of the fixed structure and socket 28 as an assembly in which the ball is encapsulated, leaving the ball a few microns clearance enabling it to rotate.

This pivot joint can be used in a machine such as a Stewart platform which comprises a base, an upper structure and a plurality, for example, six struts joining the base to the upper structure. The struts are rotatably mounted to the base and upper structure at each end and the length of the strut between its mounts is adjustable to vary the position of the upper structure with respect to the base.

U.S. Pat. No. 6,662,461 discloses such a machine in which six struts join the base to the upper structure. Three pivot joints are provided at each of the upper structure and base, with two struts being mounted on each pivot joint.

FIG. 5 is a perspective view of a machine having a base 32 and upper structure 34. Three pivot joints 36*a,b,c* are located in the upper structure 34 and three pivot joints 38*a,b,c* are located in the base 32. Six struts 40*a-f* connect the upper structure 34 to the base 32 and are mounted to a pivot joint at each end. Each pivot joint may have the arrangement as illustrated in FIG. 1, with one strut being connected to the ball and the other strut having a socket in engagement with the ball.

FIG. 6 is a side view of a strut suitable for use in the machine illustrated in FIG. 5. The strut 40 is made of inner and outer parts 42,44 which fit together telescopically. A ball 12 is provided at one end of the strut and a socket 28 is provided inside the other end. The length of the strut at any time is an accurate measure of the distance between the ball 12 at one end and the ball onto which the socket 28 is mounted. This length is measured by any convenient transducer system, for example a scale 43 within part 42 over which passes a readhead 45 attached to the part 44, as shown, for example, in FIG. 8.

Struts 40 of the type illustrated in FIG. 6 may be mounted in the machine in alternate directions, so that the socket end of one strut is mounted on the ball end of another strut. This has the advantage that only one design of strut is required. Alternatively, two types of struts could be used, a ball at each end and one with a socket at each end.

Although the above embodiments describe that the sockets are biased onto the ball by magnetic means, other biasing means are possible. For example, the ball and socket may be held together under gravity.

This design of pivot joint has several advantages. By attaching the ball to one of the struts, the end of the strut adjacent the ball can be made much thinner than is required for a strut having a socket at one end. This is because the socket preferably has three point contact with the ball and the wider apart the three points, the better positioning of the socket relative to the ball. Thus, a greater range of motion of the two struts is possible than if both struts were mounted onto a ball via sockets. Pivoting of the two struts about the ball in this way, within a plane substantially parallel to the longitudinal axis of the fixed member, allows an acute angle to be formed between the two struts.

Another advantage is that the scale within the telescopic strut can be attached to the ball, thereby improving the accuracy of the measurement of the ball to ball distance.

This type of machine can be used for example as a coordinate measuring machine or machine tool, in which an arm is added to one of the upper structure and base and an operating module such as a measurement probe or tool mounted thereon. A part to be measured or machined is mounted on the other of the upper structure and base.

The invention claimed is:

1. A pivot joint comprising a first member, a fixed member and a second member, wherein:
   the first member has an at least part spherical region rotationally fixed to one end thereof;
   the fixed member has one or more bearing surfaces positioned onto the at least part spherical region;
   the second member has one or more bearing surfaces located at one end thereof, the one or more bearing surfaces of the second member being positioned onto the at least part spherical region;
   the first and second members are pivotable relative to the fixed member about a center of the at least part spherical region; and
   the end of the first member adjacent the at least part spherical region is thinner than the end of the second member that is positioned onto the at least part spherical region.

2. A pivot joint according to claim 1, wherein the at least part spherical region comprises a ball.

3. A pivot joint according to claim 1, wherein a biasing device is provided to bias the one or more bearing surfaces of the second member against the at least part spherical region.

4. A pivot joint according to claim 3, wherein the biasing device comprises a magnet.

5. A pivot joint according to claim 1, wherein
   the one or more bearing surfaces of the fixed member provide three points of contact with the at least part spherical region, the three points of contact being provided by projections that project away from a concave surface of the fixed member.

6. A pivot joint according to claim 1, wherein the one or more bearing surfaces of the fixed member provide a line contact with the at least part spherical region.

7. A pivot joint according to claim 1, wherein one or both of the fixed member and second member form an assembly in which the at least part spherical region is received.

8. A pivot joint according to claim 1, wherein a biasing device is provided to bias the one or more bearing surfaces of the fixed member against the at least part spherical region.

9. A pivot joint according to claim 8, wherein the biasing device comprises a magnet.

10. A pivot joint according to claim 1, wherein the one or more bearing surfaces of the second member provide three points of contact with the at least part spherical region.

11. A pivot joint according to claim 1, wherein the one or more bearing surfaces of the second member provides a line contact with the at least part spherical region.

12. A pivot joint according to claim 1, wherein the one or more bearing surfaces of the fixed member are concave, with the one or more concave bearing surfaces of the fixed member being positioned onto one or more convex bearing surfaces of the at least part spherical region of the first member.

13. A pivot joint according to claim 1, wherein the one or more bearing surfaces of the second member are concave, with the one or more concave bearing surfaces of the second member being positioned onto one or more convex bearing surfaces of the at least part spherical region of the first member.

14. A pivot joint according to claim 1, wherein the at least part spherical region of the first member has a convex shape.

15. A pivot joint according to claim 1, wherein a longitudinal axis of the first member passes substantially through the center of the at least part spherical region of the first member.

16. A pivot joint according to claim 1, wherein a longitudinal axis of the second member passes substantially through the center of the at least part spherical region of the first member when the one or more bearing surfaces of the second member are positioned onto the at least part spherical region.

17. A pivot joint according to claim 1, wherein the one or more bearing surfaces of the second member face, on average, in substantially the same direction as a longitudinal axis of the second member.

18. A pivot joint according to claim 1, wherein the first and second members are pivotable about the center of the at least part spherical region within a plane substantially parallel to a longitudinal axis of the fixed member so as to form an acute angle between the first and second members.

19. A pivot joint according to claim 1, wherein the first and second members are pivotable about the center of the at least part spherical region so as to position longitudinal axes of the first, second and fixed members in a plane with substantially equal angles between adjacent longitudinal axes.

20. A pivot joint according to claim 1, wherein the first and second members are pivotable about the center of the at least part spherical region such that a first, second and third distances are substantially equal,
the first distance being between a center of the one or more bearing surfaces of the second member and a center of the one or more bearing surfaces of the fixed member,
the second distance being between the center of the one or more bearing surfaces of the second member and a center of attachment between the first member and the at least part spherical region, and
the third distance being between the center of attachment between the first member and the at least part spherical region and the center of the one or more bearing surfaces of the fixed member.

21. A pivot joint according to claim 1, wherein the at least part spherical region comprises at least part of a ball.

22. A pivot joint according to claim 1, wherein at least the first member comprises a transducer system for providing a measure of a distance dependent on the length of the member.

23. A pivot joint according to claim 22, wherein the transducer system comprises a scale within a first part of the first member over which passes a readhead attached to a second part of the first member as a length of the first member changes.

24. A pivot joint according to claim 1, wherein the pivot joint is a precision pivot joint.

25. A pivot joint according to claim 1, wherein the first member and the at least part spherical region are formed as one piece.

26. A machine comprising:
a first structure;
a second structure; and
at least a first strut and a second strut, each of the first strut and the second strut connecting the first structure to the second structure, wherein
the first strut comprises a first member that has an at least part spherical region rotationally fixed to one end thereof,
the second strut comprises a second member that has one or more bearing surfaces located at one end thereof, the one or more bearing surfaces of the second member being positioned onto the at least part spherical region,
the first structure comprises a fixed member that has one or more bearing surfaces positioned onto the at least part spherical region,
the first and second members are pivotable relative to the fixed member about a center of the at least part spherical region, and
the end of the first member adjacent the at least part spherical region is thinner than the end of the second member that is positioned onto the at least part spherical region.

27. A machine according to claim 26, wherein lengths of the first strut and the second strut are adjustable.

28. A pivot joint according to claim 26, wherein the machine is a coordinate positioning machine.

29. A pivot joint according to claim 28, wherein the machine is a coordinate measuring machine.

* * * * *